(12) United States Patent
Acharya et al.

(10) Patent No.: US 6,348,929 B1
(45) Date of Patent: Feb. 19, 2002

(54) SCALING ALGORITHM AND ARCHITECTURE FOR INTEGER SCALING IN VIDEO

(75) Inventors: Tinku Acharya, Tempe; Werner Metz, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/008,131

(22) Filed: Jan. 16, 1998

(51) Int. Cl.[7] .................................................. H04N 3/14
(52) U.S. Cl. ...................... 345/660; 345/666; 345/667; 345/668; 345/669; 348/273
(58) Field of Search .......................... 345/660, 67, 666, 345/667, 668, 669, 670, 671; 348/581, 273; 358/512, 525

(56) References Cited

U.S. PATENT DOCUMENTS

| | | | | | |
|---|---|---|---|---|---|
| 4,494,214 A | * | 1/1985 | Bernard et al. | ............. | 364/724 |
| 5,402,513 A | * | 3/1995 | Schafer | ........................ | 382/47 |
| 5,418,565 A | * | 5/1995 | Smith | .......................... | 348/273 |
| 5,574,572 A | * | 11/1996 | Malinowski et al. | ....... | 358/451 |
| 6,028,589 A | * | 2/2000 | Mehra et al. | ................ | 345/154 |
| 6,061,094 A | * | 5/2000 | Maietta | ........................ | 348/446 |
| 6,091,426 A | * | 7/2000 | Hauck et al. | ............... | 345/439 |
| 6,108,047 A | * | 8/2000 | Chen | ........................... | 348/581 |

\* cited by examiner

Primary Examiner—Matthew Luu
Assistant Examiner—Daniel J Chung
(74) Attorney, Agent, or Firm—Blakely, Sokoloff, Taylor & Zafman LLP

(57) ABSTRACT

A method for scaling of an image that includes providing an N-tap filter to be applied upon an image region and applying the N-tap filter variously to the image region and obtaining therefrom at least one scaled image pixel, such that N is equal to the scaling factor plus one. For instance, a 4:1 scaling procedure is achieved using a five-tap filter. By carefully selecting the coefficient of the five-tap filter, 2:1 scaling with a three-tap filter may be achieved using the same hardware and adding control signals and selectors. The scaling methodology and apparatus work directly in the CFA domain and provide efficient single pass dual-moded or multi-moded scaling capability.

27 Claims, 7 Drawing Sheets

| 1*R11 | 2*R13 | 2*R15 | 2*R17 | 1*R19 |
|---|---|---|---|---|
| 2*R31 | 4*R33 | 4*R35 | 4*R37 | 2*R39 |
| 2*R51 | 4*R53 | 4*R55 | 4*R57 | 2*R59 |
| 2*R71 | 4*R73 | 4*R75 | 4*R77 | 2*R79 |
| 1*R91 | 2*R93 | 2*R95 | 2*R97 | 1*R99 |

Fig. 4(a)

| 1*G'12 | 2*G'14 | 2*G'16 | 2*G'18 | 1*G'10 |
|---|---|---|---|---|
| 2*G'32 | 4*G'34 | 4*G'36 | 4*G'38 | 2*G'30 |
| 2*G'52 | 4*G'54 | 4*G'56 | 4*G'58 | 2*G'50 |
| 2*G'72 | 4*G'74 | 4*G'76 | 4*G'78 | 2*G'70 |
| 1*G'92 | 2*G'94 | 2*G'96 | 2*G'98 | 1*G'90 |

Fig. 4(b)

| 1*G21 | 2*G23 | 2*G25 | 2*G27 | 1*G2 |
|---|---|---|---|---|
| 2*G41 | 4*G43 | 4*G45 | 4*G47 | 2*G2 |
| 2*G61 | 4*G63 | 4*G65 | 4*G67 | 2*G2 |
| 2*G81 | 4*G83 | 4*G85 | 4*G87 | 2*G2 |
| 1*G01 | 2*G03 | 2*G05 | 2*G07 | 1*G09 |

Fig. 4(c)

| 1*B22 | 2*B24 | 2*B26 | 2*B28 | 1*B20 |
|---|---|---|---|---|
| 2*B42 | 4*B44 | 4*B46 | 4*B48 | 2*B40 |
| 2*B62 | 4*B64 | 4*B66 | 4*B68 | 2*B60 |
| 2*B82 | 4*B84 | 4*B86 | 4*B88 | 2*B80 |
| 1*B02 | 2*B04 | 2*B06 | 2*B08 | 1*B00 |

Fig. 4(d)

| 1*R11 | 2*R13 | 1*R15 |
|---|---|---|
| 2*R31 | 4*R33 | 2*R35 |
| 1*R51 | 2*R53 | 1*R55 |

Fig. 5(a)

| 1*G'12 | 2*G'14 | 1*G'16 |
|---|---|---|
| 2*G'32 | 4*G'34 | 2*G'36 |
| 1*G'52 | 2*G'54 | 1*G'56 |

Fig. 5(b)

| 1*G21 | 2*G23 | 1*G25 |
|---|---|---|
| 2*G41 | 4*G43 | 2*G45 |
| 1*G61 | 2*G63 | 1*G65 |

Fig. 5(c)

| 1*B22 | 2*B24 | 1*B26 |
|---|---|---|
| 2*B42 | 4*B44 | 2*B46 |
| 1*B62 | 2*B64 | 1*B66 |

Fig. 5(d)

SCALING ALGORITHM AND ARCHITECTURE FOR INTEGER SCALING IN VIDEO

BACKGROUND OF THE INVENTION

1. Field of the Invention

The invention relates generally to image processing. More specifically, the invention relates to image processing suited to bandwidth constrained applications such as videoconferencing.

2. Description of the Related Art

A digital image of a scene/environment has a particular size which is defined by the number of rows and columns of pixels (individual color/intensity points) that it contains. The image size or "resolution" is thus expressed as the number of columns multiplied by the number of rows. For instance, an image with a resolution of 768×576 has 768 columns and 576 rows of pixels for a total of 442,368 pixels.

Often, the original size of an image as captured by an imaging device such as a camera or as later represented is too large for a particular application. While a larger resolution image contains more image information (more pixels per area) and is likely of a more desirable visual quality than a lower resolution image, bandwidth, memory and other constraints may dictate that a lower resolution image be used. For certain devices, such as digital cameras, it may be desirable to reduce the device's overall cost by utilizing a smaller resolution image so that the required storage component in the device is also smaller. In the context of videoconferencing, for instance, certain standardized image formats such as QCIF (Quarter Common Intermediate Format) have been defined so that receiving and transmitting nodes do not have to be concerned with converting discordant image sizes. In videoconferencing, it is often desirable to maintain a certain "frame" rate (the rate at which individual image frames are received and/or rendered for output). To maintain this frame rate, formats such as QCIF have been defined which are typically smaller than most captured digital image sizes, particularly those captured from certain digital cameras. Since an image may not be originally the same resolution as that desired by a particular application, a process known as image scaling is employed. When an image is scaled "up," its size is increased and when it is scaled "down" its size is reduced. Hereinafter, when the application refers to "scaling" or "scaled image", down scaling or reduction in image size is the intended meaning and usage of those terms.

The scaling of an image should be distinguished from image cropping, where the resolution is reduced by cutting out a portion of the image. Scaling implies that while the size of the image is reduced, the entire scene/environment in the unscaled image (hereinafter variously referred to as "original" or "unscaled" image) is maintained in great majority. The scene from the original image remains complete but is represented in a lower resolution after scaling.

Image scaling has been achieved in the art in several ways. The most common scaling technique averages pixels in particular image region in equal weighting and then "decimates" or throws away entire pixels in the region, thereby generating a pixel in the scaled image. The averaged pixel replaces an entire region of pixels, with the replaced region not necessarily the same size as the averaging region. For instance, consider a 2:1 scaling procedure where each two by two region of pixels in the original image is to be replaced by a single pixel in the scaled image. When determining the value of the scaled image pixel, it may be desirable to average together a larger region than the 2 by 2 region of replacement, such as a 3 by 3 neighborhood. In such an instance, the "sampling" region (3×3) is said to be larger than the "scaling" region (2×2) and may be useful in ensuring that more of the image is considered so that features that start in the scaling region and bleed over past the scaling region are given the proper consideration. An averaging method where each pixel in the sampling region is given equal weight however, is deficient in several regards. Primarily, the equal averaging of pixels has the effect of losing much of the original image information. Equal weight averaging does little to identify image features, since it treats all parts of the image region identically and then decimates all pixels.

To overcome this loss of information, certain image filtering mechanisms have been developed. For instance, for a 4:1 scaling procedure(where every 4 columns and 4 rows of pixels is replaced by a single pixel), a filter with 7 "taps" or coefficients has been developed. The seven-tap filter is applied to seven rows and columns of pixels that center about and include a center pixel. Typically, the filtering coefficients used are {1,2,4,8,4,2,1} such that the first pixel of a row or column sampled is weighted (multiplied) by 1, the second pixel in any row and column by 2 and so on. Notably, this typical filter design provides that a disproportionate weight be assigned to the center pixel (8 times that of a pixel at the beginning or end of the sampling region). Likewise, a great weighting (4 times that of beginning or end pixels) is given to pixels which are immediately adjacent to the center pixel. The assumption behind this weighting is an arbitrary one but has important consequences. Specifically, edge features, if they do not lie near the center of the sampling region where the weighting is highly disportionate to other areas, will be blurred or entirely lost because their intensity values are not prominent in the weighting.

Edges, which are defined by the abrupt differential of intensity/color from one image area or pixel to next, must have their intensity/color values properly weighted or represented in the sampling. If an edge feature does not lie in the center of the sampling region for the seven-tap filter, but rather in a corner or side of the sampling region, it will be weighted only ⅛ or ¼ of the amount given to a pixel near the center (if applying the {1,2,4,8,4,2,1} seven-tap filter). The non-edge pixels in the center of the sampling region will dominate and thus, the edge feature will be blurred or entirely lost. If the edge feature lies in the center of the sampling region, the pixels that comprise the edge will be adequately represented. Since it is impossible to predict exactly where edges are present in an image even with edge detection schemes, statistically, the typical seven-tap filter is deficient in preserving edge features in the scaled image. While a seven-tap filter does enlarge the sampling area for a 4:1 scaling procedure, it does so at the expense of edge preservation. Thus, there is a need for a scaling technique that will better preserve edge information in scaled images.

Furthermore, with regard to implementation, if scaling is to be implemented in hardware such as a CMOS (Complementary Metal-Oxide Semiconductor) imaging device, it is important to reduce the computational complexity of the scaling procedure, especially when many other functions must also be carried out by the device. When an imaging device is used to transmit image frames (a sequence of individual still images) for the purpose of videoconferencing, the transmission must be fast enough to maintain the frame rate and be compatible with the bandwidth capability of the interface between the imaging device and the processing device (computer system) that is used to package and transmit the captured image frames to the destination node. In devices that are dual-moded, which may provide both motion and still imaging, there are also desired methods and apparatus that can readily provide different levels of scaling interchangeably.

SUMMARY OF THE INVENTION

A method for scaling of an image that includes providing an N-tap filter to be applied upon an image region and applying the N-tap filter variously to the image region and obtaining therefrom at least one scaled image pixel, such that N is equal to the scaling factor plus one.

BRIEF DESCRIPTION OF THE DRAWINGS

The objects, features and advantages of the method and apparatus for the present invention will be apparent from the following description in which:

FIG. 4(a) shows an exemplary mask applied to attain a Red 4:1 scaled image pixel.

FIG. 4(b) shows an exemplary mask applied to attain a second Green (G') pixel in a scaled image.

FIG. 4(c) shows an exemplary mask applied to attain a first Green 4:1 scaled image pixel.

FIG. 4(d) shows an exemplary mask applied to attain a Blue 4:1 scaled image pixel.

FIG. 5(a) shows an exemplary mask applied to attain a Red 2:1 scaled image pixel.

FIG. 5(b) shows an exemplary mask applied to attain a second Green 2:1 scaled image pixel.

FIG. 5(c) shows an exemplary mask applied to attain a first Green 2:1 scaled image pixel.

FIG. 5(d) shows an exemplary mask applied to attain a Blue 2:1 scaled image pixel.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
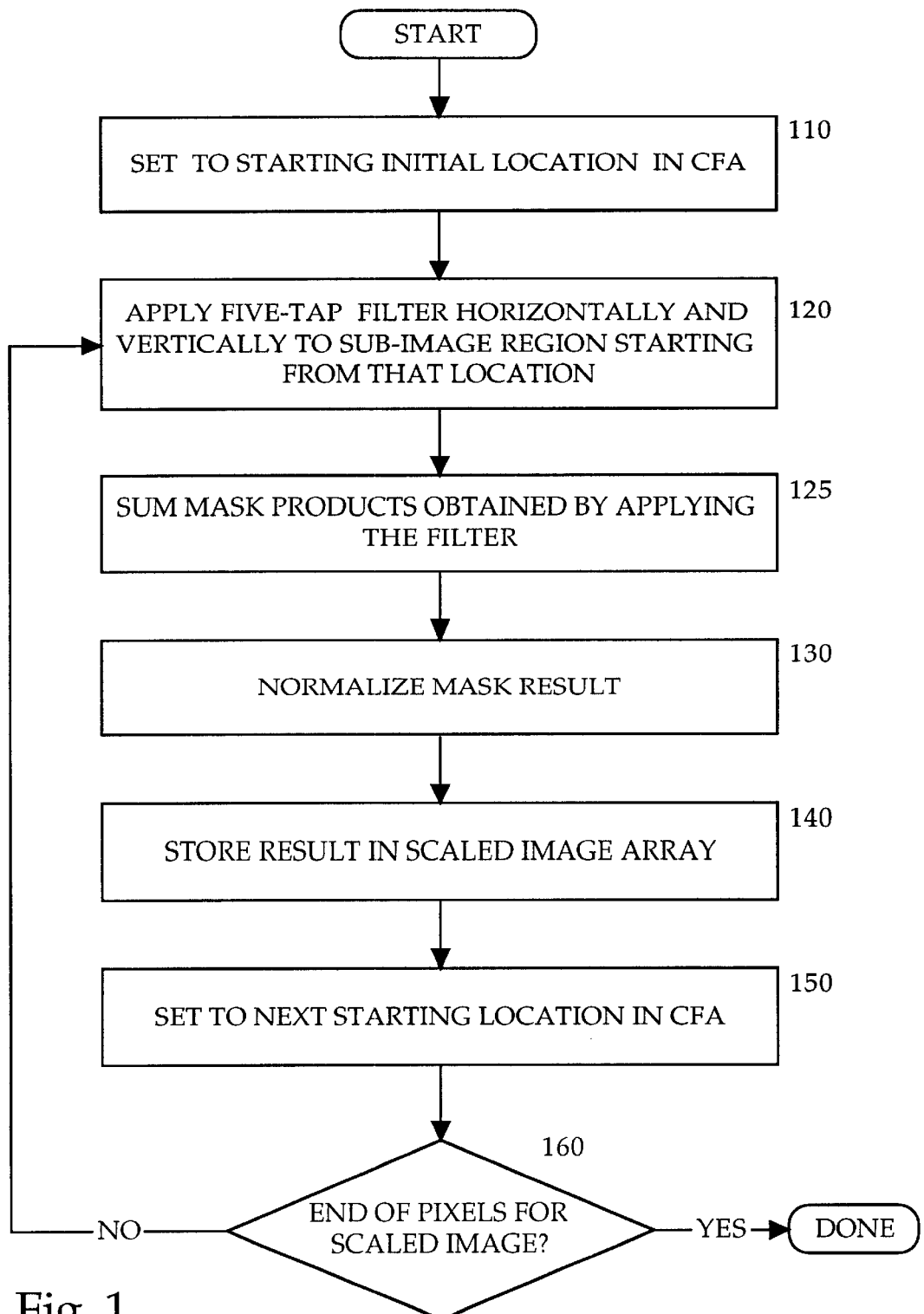
FIG. 1 is a flow diagram of one embodiment of the invention for performing 4:1 scaling.

FIG. 1 is a flow diagram of one embodiment of the invention for performing 4:1 scaling.

The technique described in FIG. 1 is applicable specifically to a image in its CFA (Color Filter Array) form, as derived for instance, from an image sensor or set of image sensors. A common CFA pattern is the Bayer pattern (described below and shown in FIG. 2) which has each pixel location in the array associated with one of three colors, Red (R), Green (G) or Blue (B). Pixels associated with Green appear twice for each Red or Blue associated pixel. For this reason, Green may be split into two separate color planes, a G (first Green) color plane and a G' (second Green) color plane. Thus, the image in its CFA form can be viewed of as consisting of four color planes, R, G, G' and B. Each color plane has a corresponding "sub-image" composed of all pixels in the CFA that are associated with that color plane. The four sub-images can be split each into their own sampling regions for which the scaling technique is applied. Each pixel is associated with only one of three colors deemed adequate to represent a "full" color pixel, one that contains all three color components, red, green and blue.

According to one embodiment of the invention, first, an initial location in the CFA is set (step 110). This location will determine the starting point for the sampling region. For instance, the first starting location for the red color plane is the red pixel at column 1, row 1 (R11) (see FIG. 2). For 4:1 scaling, a five-tap filter will, according to one embodiment of the invention, be applied horizontally and vertically to the sub-image sampling region defined as beginning from that location (step 120). The red sub-image is shown and described below with respect to FIG. 4(a) which shows the matrix ("mask") resulting if a five-tap filter is applied to the sub-image beginning at pixel R11. With a five-tap filter, a total of $5^2$ or 25 pixel locations of the sub-image will be in the sampling region of the resultant mask. The mask products (for example, see FIGS. 4(a)–(d)) are next summed together (step 125). The summation may be achieved by running accumulation during the filter application or the products may be stored separately in an array and summed together later. Next, to obtain a single intensity value representative of the scaled image pixel, the mask result is normalized (step 130) by dividing the mask result by the total weighting of the mask. In the case of the mask shown in FIG. 4(a), the divisor would thus be 64 (sum of all mask coefficients). The normalized mask result represents a pixel in the scaled image associated with the same color as the color of the sub-image. In the case of the initial pixel location, the first such normalized mask result will be a red pixel in the scaled image $R_S11$ (see FIG. 2). This normalized mask result is then stored in an array for the scaled image (step 140). The original CFA pixels cannot yet be completely discarded since some of them will be reused when the next scaled image pixel is determined. However, in one embodiment, the pixel location defining the top left corner of the region may be replaced by the newly determined scaled image pixel and thus, may eliminate the need for a separate scaled image array.

Figure 2:
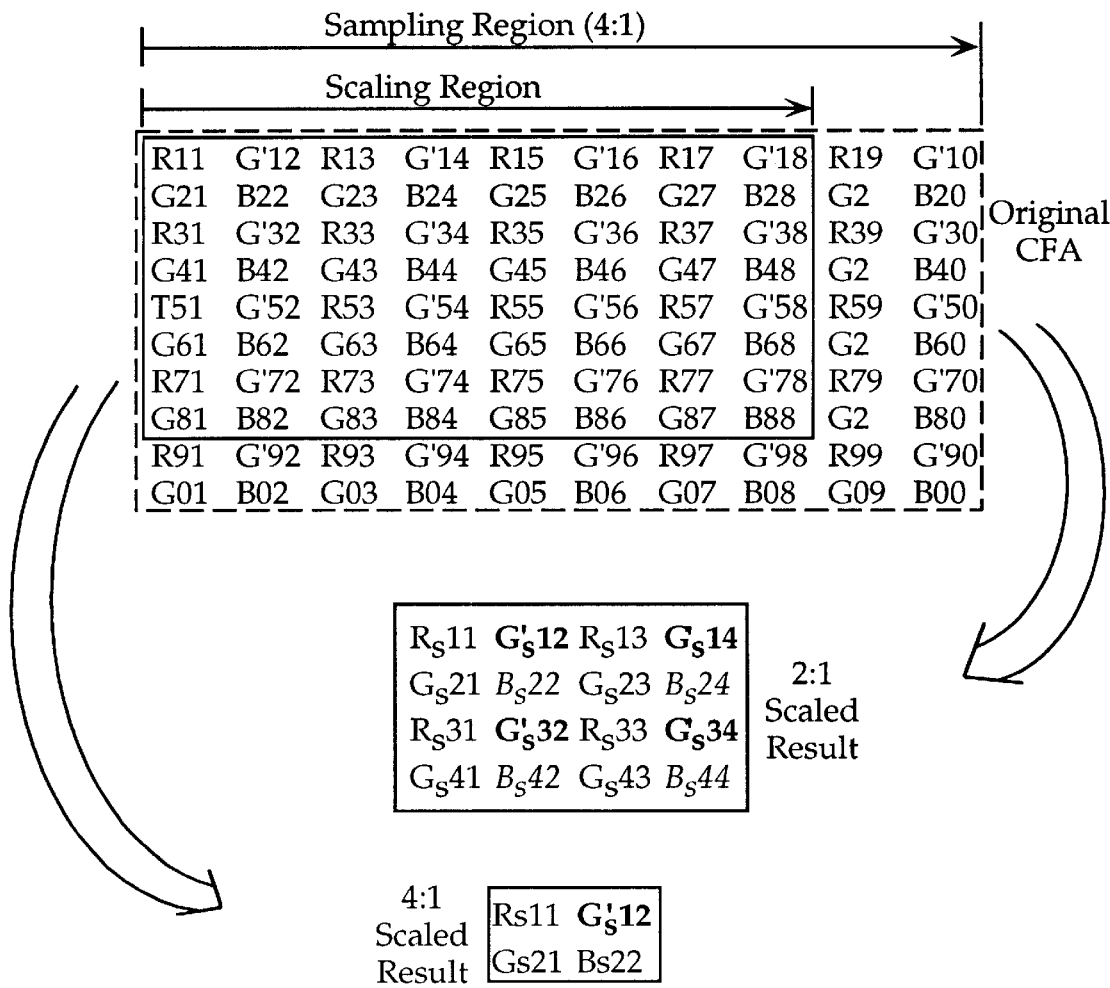
FIG. 2 shows an original CFA region that is scaled according to at least two embodiments of the invention.

After the first scaled image pixel is thus determined, the technique shifts to another location in the CFA so that the next scaled image pixel can be determined. Referring to FIG. 2 and assuming a row-wise shifting, the next pixel in the original CFA to be used as the starting location to define the next sub-image sampling region would be G'12, a pixel associated with the second Green color plane. The mask result is obtained by applying the filter to that newly defined sub-image and then summed and normalized to generate scaled image pixel $G'_S21$. Steps 120–150 repeat until there are no more pixels in the scaled image that are to be determined (checked at step 160). As shown in the FIG. 2, the region bounded by dotted lines in the original CFA will yield a set of four pixels in the scaled image $R_S11$, $G'_S12$, $G_S21$ and $B_S22$ in the case of 4:1 scaling of the original CFA image. The "scaling region" (shown bounded by solid lines in the original CFA of FIG. 2) is replaced by these four pixels in the scaled image. The starting locations (provided at step 150) for filter application to determine those four scaled pixels is, respectively, R11, G'21, G21 and B22. Once the first four pixels of the scaled image are determined, the next starting location in the original CFA would be R19, not R13. Referring to FIG. 2, since the red sub-image represented by R11 through R77 (the scaling region) will have been replaced by scaled image pixel $R_S11$, the next scaling region to consider for the red color plane is a sub-image starting from R19 and including the next four rows and columns of red pixels in the original CFPA Similarly, the next G' sub-image region starts with the pixel labeled G'10 in the original CFA of FIG. 2. In addition to column overlap, when each succeeding row of the scaled sub-image is being determined a row overlap will also occur since the sampling region is five rows of a sub-image while the scaling region is only four rows.

The mask (shown in FIG. 4(*a*)) for the first Red sub-image region includes in its sampling region the pixel R19. Since the filter is a five-tap filter, the sampling region includes the scaling region plus an additional row and column of pixels in the sub-image. Additionally, since there are four different sub-images, each offset by one row/column from the other, overall the sampling region extends two rows and columns beyond the scaling region. As mentioned earlier the starting location for applying the filter to determine the second Red scaled image pixel is R19. Thus, there is an overlap between the mask used to determine the first and second scaled Red pixels, namely, the column of pixels R19, R39, R59, R79 and R99. These five pixel values will be operated upon by both the masks used to determine the first and second Red pixels. Likewise, an overlap occurs for the three other color pixels representing the G', G and B color planes. This overlap further ensures that edge features which may indeed be at the extremity of a sampling region, are properly accounted for and represented in the scaled image since they are included in determining more than one scaled image pixel.

FIG. 2 shows an original CFA region that is scaled according to at least two embodiments of the invention.

The CFA shown in FIG. 2 may be viewed as containing four distinct color planes—Red, a first Green, a second Green and Blue. Pixels belonging to or associated with the Red color plane are designated by an "R" prefix, while pixels associated with the Blue color plane are designated by a "B" prefix. The pixels associated with the first green color plane are denoted by a "G" prefix while pixels associated with the second green color plane are denoted by a "G'" prefix. Among other reasons related to color consistency, the green color planes are separated to maintain a consistency of size when the pixels in each color plane are sampled for the scaling operation. One characteristic of a "Bayer" pattern CFA such as that shown in FIG. 2 is that pixels associated with the four color planes alternate by row and column. Thus, given a starting pixel location, it is convenient to extract or obtain a sub-image of pixels the same color as the starting location by considering every other column in the same row as the starting pixel location and then after the row has been completed, skipping the next succeeding row and repeating the procedure of the first row with the next, third row. The original CFA shown in FIG. 2 is representative of raw image data attainable from an imaging device such as a digital camera or other sensor system.

It is advantageous to separate the two green color planes since each contains slightly different information about the image in terms of the Bayer pattern thus attained. The pixels of a particular color plane collectively comprise a "sub-image" of the entire CFA, and can be considered separately in the scaling process. This is advantageous over prior art scaling techniques which attempt to average together all neighboring pixels. Such techniques were developed with the assumption that the original image is not in Bayer pattern form, but rather, has each pixel location containing full RGB color information. An averaging and/or decimation technique that simply throws away original pixels in the scaled image which may be adequate for full-color pixel images would be inadequate for direct application to a CFA image. For instance, a scaling technique using averaging that provides 2:1 scaling down of an image, would replace the value R11 at column 1, row 1 of FIG. 2 with the average of the three neighboring pixels G21, G'12 and B22 together with R11. However, such an averaging is inappropriate since each pixel contains different information in its image representation capacity. The two green pixels G21 and G'12 contain chrominance information while B22 and R11 contain luminance information. The mixing of the four color planes in such a manner to attain what is essentially a pixel belonging to the Red color plane distorts and destroys the red color information. Likewise, an averaging applied to G, G' or B pixels would result in a mixing together of color plane information which would destroy the information (such as chrominance) contained therein regarding the image. Similarly, a brute-force scaling that merely throws away (decimates) the G21, G'12 and B22 pixels completely when scaling would have the effect of destroying even more image information and essentially leave a CFA which cannot be transformed into a full color image by a technique such as color interpolation. Since the scaled image should represent the original image as closely as possible, the scaled image should also be in a Bayer pattern identical in scheme to the unscaled original CFA. As best illustrated in the 2:1 scaled image shown in FIG. 2, the Bayer pattern scheme/sequence is maintained. Regardless of the size of the original unscaled image, the CFA pattern should be maintained so that other imaging processes such as color companding (reducing resolution of each of pixel), color interpolation (forming full color RGB pixels from the Bayer pattern pixels), noise removal, and so on are not adversely affected.

To achieve these results and overcome these obstacles for a CFA image, according to one embodiment of the invention, scaling is achieved by applying a filter to a region of each sub-image independently. The filter can be applied row-wise to the sub-image region and then column-wise as well. When so applied, the filter will form a matrix of coefficients (a mask) by which the intensity values of pixels in the sub-image region are multiplied. The resultant dot product value (i.e., sum of all mask products) is normalized against the weight of the mask as shown in FIG. 1. This normalized value will then represent the value of a scaled image pixel associated with the color plane of the sub-image.

A "scaling" region (illustrated in FIG. 2 with solid boundary) consists of an 8 by 8 original CFA region of pixels which are transformed into a 2 by 2 scaled image region in the case of 4:1 scaling and a 4 by 4 scaled image region in the case of 2:1 scaling. According to one embodiment of the invention, a five-tap filter is applied to determine the scaled image pixels for 4:1 scaling. Thus, when scaling four pixels of a sub-image region to a single pixel, five pixels of the sub-image region are actually considered or "sampled". Since the pixels of a particular sub-image are offset by 1 pixel (in row and/or column) in the original CFA, the sampling region is ten pixels by ten pixels square. For instance, if the 4:1 scaled image pixel $R_S11$ is to be determined, a five-tap filter is applied to red pixels R11, R13, R15, R17 and R19 etc. and then to pixels R31, R33, R35, R37 and R39 and so on in a row-wise manner for five rows, and then again in a column-wise manner to pixels R11, R31, R51, R71 and R91 and then R13, R33, R53, R73 and R93 to five such columns. Likewise, the $G'_S11$ scaled pixel may be determined by considering the pixels G'11 to G'19 in the original CFA. Thus, the sampling region is shown to be larger than the scaling region. As described below, this leads to an overlap of the sampling used for two same sub-image pixels in the scaled image which aids in more properly detecting edges features than typical scaling techniques.

Figure 3A:
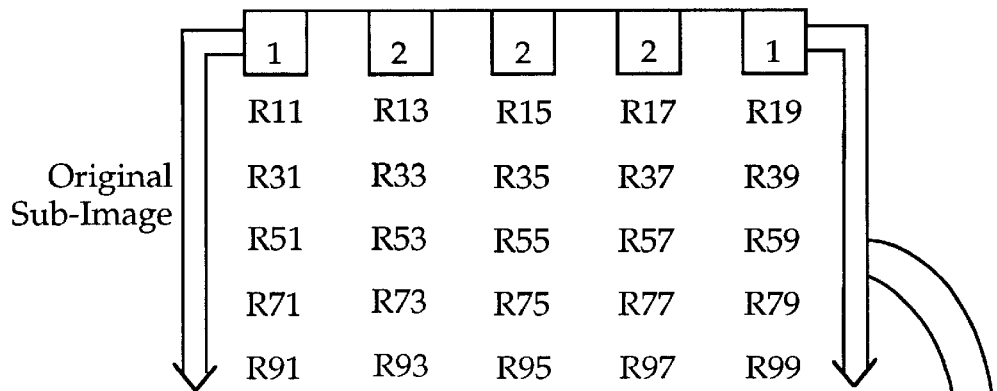
FIGS. 3(a)–3(c) shows the stages of filter application to obtain the mask for an exemplary Red sub-image CFA region.
Figure 3B:
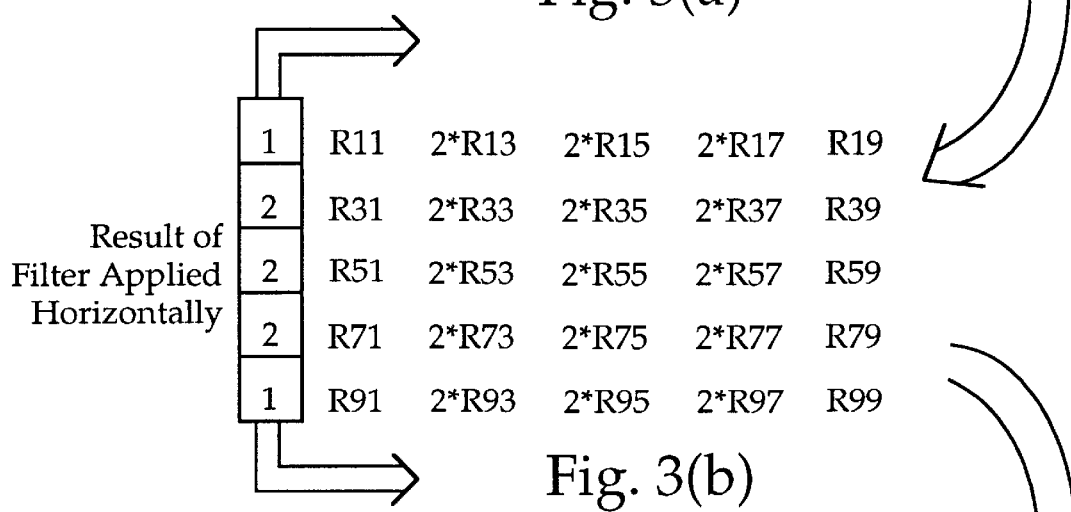
Figure 3C:
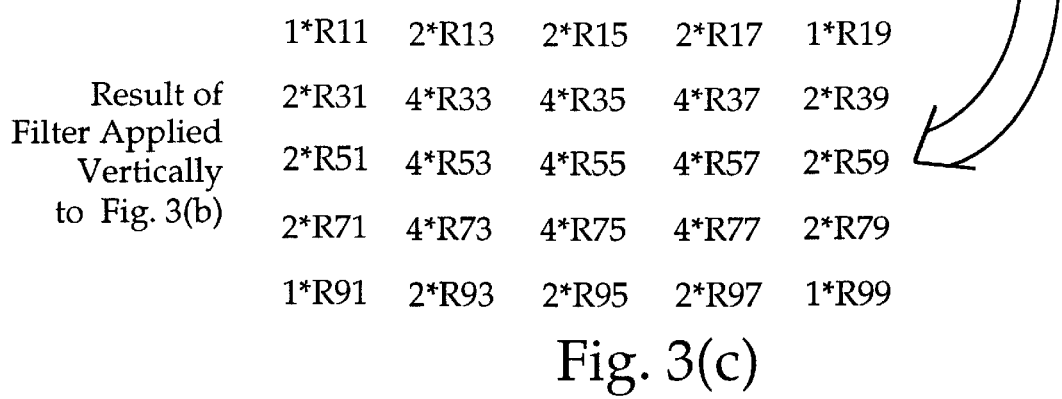

FIGS. 3(a)–3(c) shows the stages of filter application to obtain the mask for an exemplary Red sub-image CFA region.

FIG. 3(a) shows a Red sub-image region in the original CFA. For a five-tap filter applied both vertically and horizontally an entire 5 by 5 region (25 pixels) of pixels all associated with the Red color plane must be considered. This sampling region of twenty five pixels does not appear contiguous and adjacent in the CFA, but rather is offset. The sub-image obtained for a given color plane is extracted from the original CFA by skipping every other pixel column and row therein (see FIG. 2).

If a five-tap filter with coefficients of {1,2,2,2,1} in accordance with one embodiment of the invention is applied in a horizontal manner (i.e., the filter is applied across a sub-image row) to the original sub-image of FIG. 3(a) the result will be the array shown in FIG. 3(b). The central three columns of pixels will have their respective intensity values multiplied by two, while the first and last (fifth) column will retain an identity relationship with the corresponding pixels in the original sub-image of FIG. 3(a). If the filter {1,2,2,2,1} is applied to the array of FIG. 3(b) now in a vertical manner, the array of FIG. 3(c) will result. The array shown in FIG. 3(c) is representative of the mask products that will be summed together to yield a single value which can then be normalized as described above with respect to FIG. 1.

According to one embodiment of the invention, the five-tap filter has coefficients of {1,2,2,2,1}. This ensures that the central pixels are no more than 4 times the weight of the corner pixels within the sub-image region. Referring to FIG. 3(c), it is of note that the non-corner side pixels (in the first and last rows and columns of the region) are ½ the weight of the central 9 pixels that are weighted by 4 as a result of the mask application. Again, though no prediction can be made as to where the edge feature may lie within this sub-image, no one pixel, which can never fully represent an edge, dominates as it would with the typical seven-tap filter {1,2,4,8,4,2,1} mentioned above. By keeping the correlation between pixels in the sampling region close, there is more of a statistical guarantee that an edge feature will properly represented and not decimated. This is particularly true since edge features that have significant visual impact (i.e., that are clearly visible) will usually pass through a region of at least more than just one or two pixels. The five-tap filter of various embodiments of the invention is also less compuationally intensive than the typical seven-tap filter in reducing the number of multiply-add operations from 72 or 49 down to 25.

As will be described below, the five-tap filter and the particular choice of coefficients has important implications in addition to reduction of compute time if a hardware implementation is desired. Further, where 2:1 scaling is also desired, a three-tap filter of {1,2,1} will be shown to conveniently be a special case of a five-tap filter and thus will have easy dual and concurrent implementation possibility in hardware.

FIG. 4(a) shows an exemplary mask applied to attain a Red 4:1 scaled image pixel.

Referring to back FIG. 3, the five-tap filter described in various embodiments of the invention may be applied first row-wise to the sampling region and then again column-wise to the result of the row-wise application. The intensity value of a scaled image pixel is determined by applying the filter to obtain a mask upon a sub-image sampling region. FIG. 4(a) shows the mask needed to determine the red scaled image pixel $R_S11$ for the scaling region shown in FIG. 2. The next red scaled image pixel $R_S31$ in the same row as $R_S11$ will have a sampling region in the original CFA which overlaps the fifth column of the sub-image sampling region for scaled image pixel $R_S11$. The mask products shown in FIG. 4(a) are summed together to obtain a single value. Since each pixel in a CFA ordinarily has a set intensity resolution, typically a value of 8-bits (0 to 255), the sum of the mask products must be normalized to such a value. This is achieved by simply dividing the sum of the mask products by the sum of the mask coefficients. Since there are nine terms with a coefficient of 4, 12 terms have a coefficient of 2 and 4 have a coefficient of 1, the total "weight" of the mask (the sum of the coefficients) is 64.

The distribution of the mask coefficients across the sampling region shows that the relative coverage or representation in the scaled image between the center pixels and a corner pixel in the sampling region is only four times. Further, the center nine pixels and non-corner side pixels have a relative coverage differential of only twice. This aids in edge detection since no one pixel is given undue weight, and unlike straightforward averaging, functions to better cover the more important areas within a region such as the center. Unlike the typical seven-tap filter process discussed above, an entire center region, not just a single center pixel, is well represented in the scaled image. A similar mask can be obtained for the second Red scaled (4:1) image pixel $R_S21$ by considering a sampling region starting also at the next scaling region (see FIG. 2) which has an initial upper-left corner location of R51.

FIG. 4(b) shows an exemplary mask applied to attain a second Green (G') pixel in a scaled image.

The mask used to obtain a scaled image pixel G'S12 belonging to the G' color plane(see FIG. 2) is similar to the mask of FIG. 4(a) in that the distribution of coefficients in the mask array is identical. However, the pixels sampled are entirely different as these pixels represent not a Red sub-image region, but a second Green (G') sub-image region. The starting pixel of the sampling region for the G' sub-image region is G'12 in the original CFA (see FIG. 2). Starting with this location G'12, the five-tap filter is applied vertically and horizontally to the G' sub-image like that shown for the Red sub-image in FIGS. 3(a) to 3(c). The resultant mask is shown in FIG. 4(b). As with the Red scaled image pixel, the G' scaled image pixel may be obtained by summing the mask products and then dividing by the total weighting of the mask (64). Referring back to FIG. 2, the 4:1 scaled image pixel G'12 results from this procedure. A similar mask can be obtained by applying the filter to another G' sub-image sampling region to obtain another G' scaled image pixel.

FIG. 4(c) shows an exemplary mask applied to attain a first Green 4:1 scaled image pixel.

A 4:1 scaled image pixel belonging to the first Green or G color plane is obtained in an identical manner with the Red and G' scaled image pixels shown above except that the filter is applied to a G sub-image (sampling) region. The application of the five-tap filter {1,2,2,2,1} vertically and horizontally to a G sub-image sampling region beginning with the pixel G21 will result in the mask products shown in FIG. 4(c). By considering other sub-image sampling regions, for instance, a region starting with pixel G2 (see FIG. 2) in the original CFA, the next G scaled image pixel can be determined.

FIG. 4(d) shows an exemplary mask applied to attain a Blue 4:1 scaled image pixel.

A 4:1 scaled image pixel belonging to the Blue or B color plane is obtained in an identical manner with the Red, G' and G scaled image pixels described above except that the filter is applied to a B sub-image (sampling) region. The application of the five-tap filter {1,2,2,2,1} vertically and horizontally to a B sub-image sampling region beginning with the pixel B22 will result in the mask products shown in FIG. 4(c). By considering other sub-image sampling regions, for instance, a region starting with pixel B20 (see FIG. 2) in the original CFA, the next G scaled image pixel can be determined.

By repeatedly applying the filter to sub-image sampling regions, certain scaling regions (see FIG. 2) may be mapped to scaled image pixels. The scaled image pixels together will form the same color plane distribution pattern (such as the Bayer pattern) that is present in the original unscaled CFA. Though the above examples show a Bayer pattern CFA with a RGG'B color scheme, the five-tap filter technique can be applied to an image in any format with simple modifications to the composition of the sampling region, and if necessary, the values of the filter taps. Further, as noted above FIGS. 4(a) through 4(d) show masks for pixels of an image that is scaled down in size by 4. As will be described later, the quarter-size image scaling can be utilized in motion video applications such as videoconferencing.

In other applications where a half-size or 2:1 scaling is needed, the five-tap filter procedure described above can be modified as follows. For a 2:1 scaled image every two rows and columns of pixels in the original unscaled CFA will be mapped or reduced to a single scaled image pixel. This case is shown in FIG. 2, where a 2:1 scaled image region is shown to be ½ the size of the scaling region in the original CFA. A five-tap filter would sample more pixels than is sufficient, and thus, a three-tap filter may be used instead. The conventional seven-tap filter cannot easily be modified down to fit a three-tap filter for a 2:1 scaling ratio. However, the reverse is true, such that if a three-tap filter is repeatedly applied three times, a seven-tap filter will result. This traditional method of utilizing a three-tap filter in succession to generate a seven-tap filter has several disadvantages, especially if hardware-implemented scaling is desired. The repeated operation of the three-tap filter to yield a seven-tap filter result increases the time required to scale an image by a factor of three. If a fast hardware implementation of such dual-mode (2:1 and 4:1) scaling is desired, as is often the need for videoconferencing applications, utilizing a seven-tap filter with a three-tap filter would be extremely disadvantageous. If a separate seven-tap filter were provided for with a three-tap filter to avoid the unacceptable time lag problem of a repeated, staggered three-tap filter, a disadvantage arises in that more silicon area is needed to implement the two different filters side-by-side.

The five-tap filter proposed in various embodiments of the invention more easily accommodates a three-tap filter for 2:1 scaling in that it introduces only a few modifications. An optimal three-tap filter, the result of whose application is shown in FIGS. 5(a)–5(d), is {1,2,1}. Such a filter applied horizontally and vertically to a sub-image sampling region will yield the mask products shown in FIG. 5(a) and like the 4:1 scaling mask products, has no more than a 4:1 differential in representation for a center pixel in the sampling region than a corner pixel. The five-tap filter {1,2,2,2,1} can easily be transfigured to a three-tap filter {1,2,1}. The three-tap filter may be considered a special case 4:1 scaler that has a five-tap filter coefficients of {0,1,2,1,0}. The implementation of such a special case to arrive at a three-tap filter is described below with respect to FIG. 6.

FIG. 5(a) shows an exemplary mask applied to attain a Red 2:1 scaled image pixel.

A Red scaled (by 2:1) image pixel may be obtained by applying a three-tap filter {1,2,1} both vertically and horizontally to a Red sub-image sampling region. The application of the ree-tap filter {1,2,1} applied vertically and then horizontally to an R sub-image sampling region beginning with pixel R11 of the original CFA will result in the mask products shown in FIG. 5(a). Referring back to FIG. 2, one such Red scaled image pixel $R_S11$. The products of the mask of FIG. 5(a) if summed together and normalized by the total weighting of the mask (16) will yield $R_S11$. Likewise, by changing the sampling region to start at R15 of the original CFA, the second Red scaled image pixel $R_S13$.

FIG. 5(b) shows an exemplary mask applied to attain a second Green 2:1 scaled image pixel.

A 2:1 scaled image pixel belonging to the second Green or G' color plane is obtained in a manner identical with that of the Red 2:1 scaled image pixel described above except that the three-tap filter is applied to G' sub-image sampling region. The application of the three-tap filter {1,2,1} applied vertically and then horizontally to a G' sub-image sampling region beginning with pixel G'12 of the original CFA will result in the mask products shown in FIG. 5(b). By considering another G' sub-image sampling regions, for instance, a region starting with G'16, another G' scaled image pixel $G_S'14$ may be obtained.

FIG. 5(c) shows an exemplary mask applied to attain a first Green 2:1 scaled image pixel.

A 2:1 scaled image pixel belonging to the first Green or G color plane is obtained in a manner identical with that of the Red 2:1 scaled image pixel described above except that the three-tap filter is applied to G sub-image sampling region. The application of the three-tap filter {1,2,1} applied vertically and then horizontally to a G sub-image sampling region beginning with pixel G21 of the original CFA will result in the mask products shown in FIG. 5(b). By considering another G sub-image sampling regions, for instance, a region starting with G25, another G scaled image pixel $G_S23$ may be obtained.

FIG. 5(d) shows an exemplary mask applied to attain a Blue 2:1 scaled image pixel.

A 2:1 scaled image pixel belonging to the Blue or B color plane is obtained in a manner identical with that of the Red 2:1 scaled image pixel described above except that the three-tap filter is applied to B sub-image sampling region. The application of the three-tap filter {1,2,1} applied vertically and then horizontally to a B sub-image sampling region beginning with pixel B22 of the original CFA will result in the mask products shown in FIG. 5(b). By considering another B sub-image sampling regions, for instance, a region starting with B26, another B scaled image pixel $B_S24$ may be obtained.

By repeated application of the three-tap filter {1,2,1} to all applicable sub-image sampling regions in the original CFA, an entire 2:1 scaled image or image ½ the size of the original may be obtained. The 2:1 scaled image pixels will have a color plane distribution pattern such as the Bayer pattern that is identical to the original CFA As will be described below, the 2:1 scaling three-tap filter {1,2,1} can be obtained by transfiguring the five-tap filter. The ease of hardware implementation and speed of the resulting hardware provides for an efficient dual-mode scaling apparatus capable of both 4:1 and 2:1 scaling. In still image applications such as digital camera still image capture, it is often desirable to use a 2:1 scaling method and apparatus.

Figure 6:
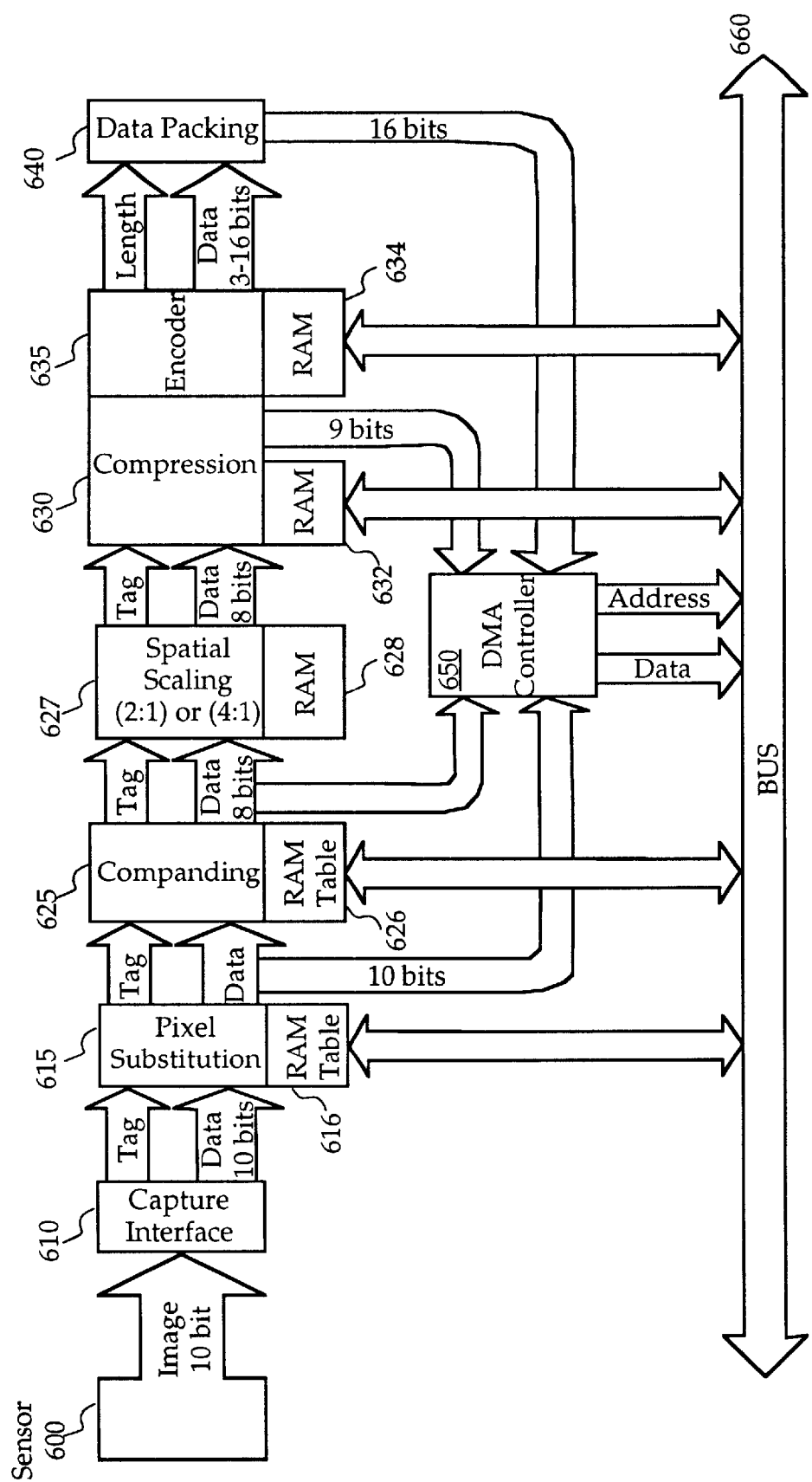
FIG. 6 is a diagram according to an embodiment of the invention.

FIG. 6 is a diagram according to an embodiment of the invention.

FIG. 6 is a block diagram of internal image processing and compression components of an image capture device. A sensor 600 generates pixel components which are color/intensity values from some source. The 10-bit pixel values generated by sensor 600 are sent to a capture interface 610. Sensor 600 in a digital camera context will typically sense either R, G, or B components from one "sense" of an area or location. Thus, the intensity value of each pixel is associated with only one of three color planes. Capture interface 610 captures the image generated by the sensor and appends TAGs identifying color association for the individual pixels. The TAGs are two bits each, for example, 00, 01, 10 and 11 for R (Red), G (even-row Green), G' (odd-row Green), B (Blue) pixels, respectively. The set of all such pixels for the entire image is the CFA.

It is typical in any sensor device that some of the pixel cells in the sensor plane may not respond to the lighting condition properly. As a result, the pixel values generated from these cell may be defective. These pixels are called "dead pixels." The "pixel substitution" unit 615 replaces each dead pixel by the immediate previously valid pixel in the row.

A RAM table 616 consists of the row and column indices of the dead pixels, which are supplied by the sensor. This RAM table 616 helps to identify the location of dead pixels in relation to the captured image. Companding module 625 is a table look-up based converter to convert each original pixel of 10-bit (labeled 10b) intensity captured from the sensor to an 8-bit intensity value. A RAM table 626 accompanies companding module 625 and stores the entries of this exemplary sensor companding table. Thus, each pixel in the CFA will be an 8-bit value representing one of the four color planes.

After companding, a spatial scaling unit 627 is used to scale down the image. If the original image size is M×N, a 2:1 scaling operation scales the image size down to M/2× N/2, while a 4:1 scaling operation scales the image size down to M/4×N/4. RAM 628 accompanies spatial scaling unit 627 and is used for intermediate storage during the scaling operation.

According to various embodiments of the invention, scaling unit 627 is capable of efficiently performing both 2:1 and 4:1 scaling. As in one embodiment of the invention, the 4:1 scaling is achieved by applying a five-tap filter {1,2,2, 2,1} to a sampling region of pixels. Since the filter taps are composed of coefficients (multipliers) of 1 or 2, the filter may be implemented by using a shift register which shifts left the intensity value for a given pixel. Three such shift registers in parallel with two buffers that simply pass the intensity values of the first and fifth pixels of the sampled row or column will result in a {1,2,2,2,1} five-tap filter.

In one embodiment of the invention, the mask products (by applying the filter horizontally and vertically to a sub-image sampling region) are summed together and then normalized to yield the scaled image pixel. The filter design using shift registers and buffers may be accompanied by an adder which adds the five products obtained at every column or row into an accumulator. When all 25 products have been accumulated, the output of the accumulator may be passed to another shift register shifting out 6 bits to the right, or in effect, dividing by 64 which is the mask weighting. Alternatively, as each row or column of pixels is being processed in the filter, the products resulting therefrom can be summed together and then normalized. For instance, the outputs of the filter can be passed to an adder to-sum the products together. This sum can then be normalized by the sum of the filter taps, which is 8 (1+2+2+2+1). The division by eight may be achieved by a shift right of 3 bits (again, using a shift register). Each normalized row or column result can be accumulated and when the filter is applied completely to the sampling region, the accumulated value may again be divided by eight (shift register of a shift right 3 bits).

As mentioned earlier, traditional seven-tap filters have been implemented by applying a three-tap filter three consecutive times. However, this approach suffers in that it requires three complete passes through the entire sampling region. By contrast, the five-tap filter and three-tap filter provided in various of embodiments of the invention can both be implemented as a single-pass operation. The five-tap filter thus implemented in scaling unit 627 achieves faster scaling than the prior art seven-tap filter and does so in a cost saving manner since the complexity of circuitry and design is greatly reduced.

Once the five-tap filter {1,2,2,1} is designed in hardware, a three-tap filter for 2:1 scaling may also be implemented by the same components with certain transfigurations. As noted earlier, the three-tap filter is a five-tap filter with taps of {0,1,2,1,0}. As such control signals and selectors may be added to the hardware implemented five-tap filter to efficiently yield a three-tap filter operation. These control signals and operators would transfigure the {1,2,2,2,1} five-tap filter design by:

1. Forcing the first and fifth filter coefficients to zero. (This involves suppressing the buffer output.)

2. Suppressing the shift left by one but for the second and fourth pixel value in the row/column (i.e., sending these pixel values to a buffer).

3. Changing the filter spacing to 2*K from 4*K. In other words, each sampling region's starting pixel location is determined by skipping two pixels over rather than 4. This also correlates with changing the scaling region that is mapped as pixel(s) in the scaled image.

4. Changing the number of bits shifted for the sum of each column or row from 3 (divide by 8) to 2 (divide by 4). If all products are first being accumulated, the shift right by 6 bits (divide by 64) is changed to shift of 4 bits (division by 16).

Utilizing the above, the original CFA may be scaled by a factor of 2 rather than 4. In each case, the operation passes over a given pixel in the sampling region only once for the determination of a given scaled image pixel. This is advantageous over the traditional 2:1 three-tap filter being applied in three passes to yield a seven-tap filter result which is much slower. With above implemented, scaled image data can more rapidly be generated and sent to the other image processing units shown in FIG. 6 and ultimately, will speed the delivery of image data over bus 660 and out of the image capture device. This is especially advantageous for the 4:1 scaling operation, which is used in videoconferencing where (frame rate maintenance) is important. The quality of the scaled image is also improved over traditional 4:1 scaling in that the five-tap filter is better suited to detecting edge features within a given sampling region. The scaled image data, obtained pixel by pixel may be passed to a compression unit 630 and on encoder 635 which compacts and encodes the scaled image data into manageable and transportable blocks. The encoded data, which is then of a variable or fixed length for each original error value is then packed together by a data packing unit 640 and then out to DMA controller 650 for transfer across BUS 660. Bus technology, addressing protocols and DMA controllers are well-known in the art of system design and can be readily modified/specialized to fit the desired application.

Each of the RAM tables 616, 626, 628, 632 and 634 can directly communicate with bus 660 so that their data can be loaded and then later, if desired, modified. Further, those RAM tables and other RAM tables may be used to store scaled image data as needed. Though the individual components (selectors, shifters, registers, and control address signals) of scaling unit 627 have not been detailed, one skilled in the art will readily be able to implement such a scaling device. The efficiency and ease of dual-mode scaling is possible due to the selection of filter size and taps. Further, as demonstrated earlier, the scaled image will have edge features preserved in a better manner than with traditional scaling.

Figure 7:
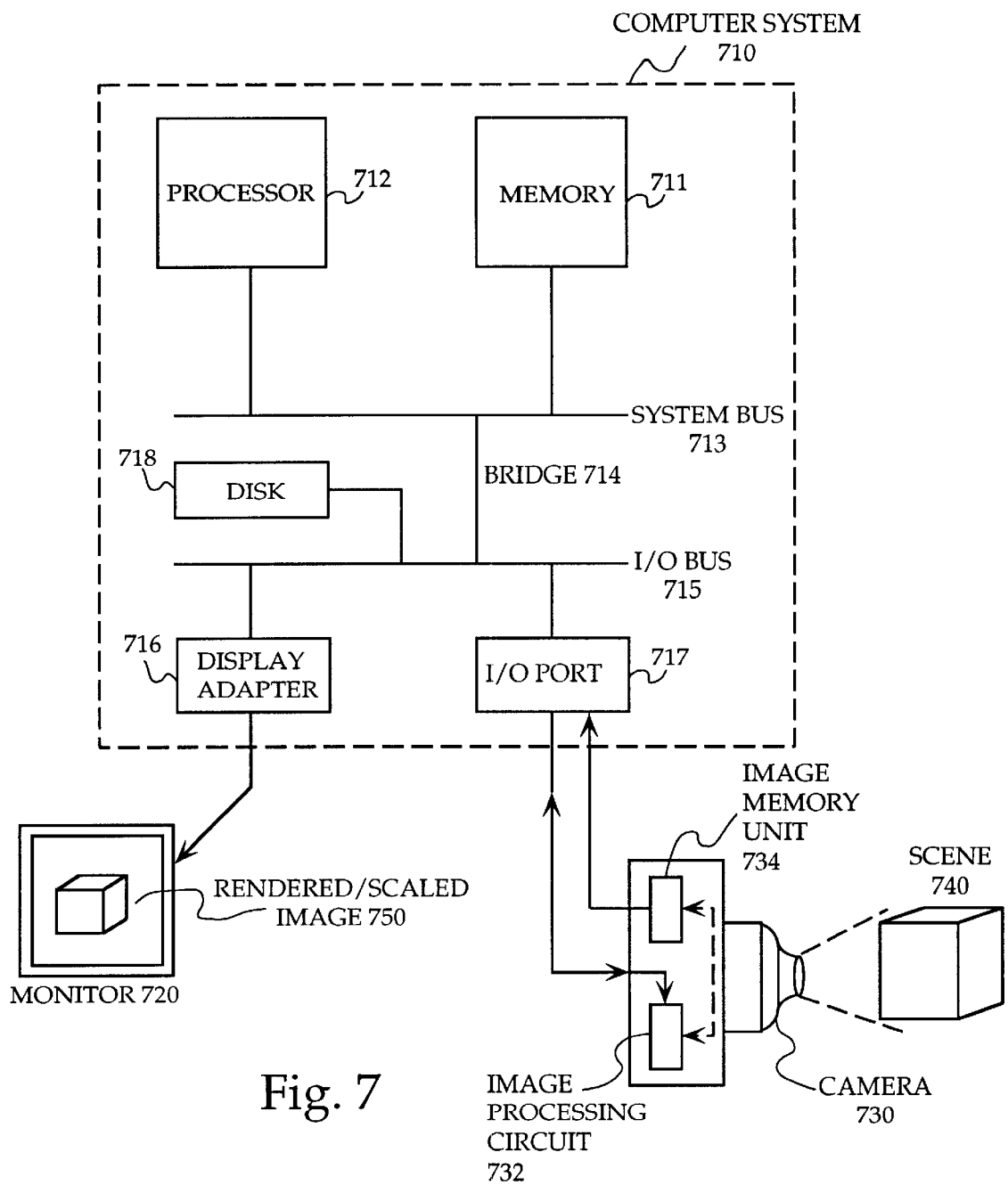
FIG. 7 is a system diagram of one embodiment of the invention.

FIG. 7 is a system diagram of one embodiment of the invention.

Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture a sensor image of an scene 740. Essentially, captured images are compressed by an image compression circuit 732 so that they can be efficiently stored in an image memory unit 734, which may be a ROM, RAM or other storage device such as a fixed disk. The image contained within image memory unit 734 that is destined for computer system 710 is enhanced in that the loss of image features due to traditionally scaling is greatly mitigated by better preserving edge features when scaling. In most digital cameras that can perform still imaging, images are stored first and downloaded later. This allows the camera 730 to capture the next object/scene quickly without additional delay. However, in the case of digital video camera, especially one used for live videoconferencing, it is important that images not only be quickly captured, but quickly processed and transmitted out of camera 730. The invention in various embodiments, particularly in the 4:1 five-tap filter scaling operation, is well-suited to providing good fast throughput to other parts of the image processing circuit 732 so that the overall speed of transmitting image frames is increased over typical seven-tap scaling techniques.

Image scaling is carried out within the image processing circuit 732 in this embodiment of the invention. After the image is scaled, it may also be compressed for transport. The decompression of the compressed and scaled image may be achieved using a processor 712 such as the Pentium® (a product of Intel Corporation) and a memory 711, such as RAM, which is used to store/load instruction addresses and result data. In an alternative embodiment, scaling may be achieved in software application running on computer system 710 rather than directly in hardware. The application(s) used to generate scaled image pixels after download from camera 730 may be an executable compiled from source code written in a language such as C++. The instructions of that executable file, which correspond with instructions necessary to scale the image, may be stored to a disk 718 or memory 711. It would be readily apparent to one of ordinary skill in the art to program a computing machine to scale an image in accordance with the methodology described above. Further, the various embodiments of the invention ay be implemented onto a video display adapter or graphics processing unit that provides scaling in various scaling factors.

Computer system 710 has a system bus 713 which facilitates information transfer o/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

When an image, such as an image of a scene 740, is captured by camera 730, they are sent to the image processing circuit 732. Image processing circuit 732 consists of ICs and other components which execute, among other functions, the scaling down of the captured image. The scaling operation, as described earlier, may utilize image memory unit to store the original CFA of the scene 740 captured by the camera 730. Further, this same memory unit can be used to store the scaled image CFA. Once all pixels are scaled, processed and transferred to the computer system 710 for rendering, the camera 730 is free to capture the next image. In the still image case, the dual-moded nature of the scaling technique in one embodiment of the invention allows for camera 730 to act as either a motion or still camera as is desired. When the user or application desires/requests a download of images, the scaled compressed images stored in the image memory unit are transferred from image memory unit 734 to the I/O port 717. I/O port 717 uses the bus-bridge hierarchy shown (110 bus 715 to bridge 714 to system bus 713) to temporarily store the scaled and compressed image data into memory 711 or, optionally, disk 718.

The compressed images are decompressed on computer system 712 by suitable application software (or hardware), which may utilize processor 712 for its execution. The image data may then be rendered visually using a display adapter 716 into a rendered/scaled image 750. The scaled image is shown as being smaller in size than the original captured scene. This is desirable in many image applications where the original sensor capture size of a scene is not needed. In a videoconferencing application, the image data in its compressed and scaled form may be communicated over a network or communication system to another node or computer system in addition to or exclusive of computer system 710 so that a videoconferencing session may take place. Since scaling and compression are already achieved on-camera in one embodiment of the invention, it may be possible to implement a communication port in camera 730 that allows the image data to be transported directly to the other node(s) in a videoconferencing session. Wherever a user of computer system 710 also desires to see his own scene on monitor 720, image data that is scaled and compressed may be sent both to computer system 710 and transported over a network to other nodes. Further, the various embodiments of the invention allow also for efficient software scaling to be implemented if desired. As discussed earlier, the scaled image will have more visually accurate edge features than typical in scaling operations due to the enhancement in the scaling process by specifically and carefully selecting filter size and taps to various other embodiments of the invention. The end result will be a higher quality rendered scaled image 750 that displayed onto monitor 720 or other nodes in a videoconferencing session as compared with even typical scaling methods.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method for scaling an image comprising:
   providing an N-tap filter to be applied upon an image region, the image region including a plurality of sub-images each sub-image having pixels associated with a particular color plane; and
   applying said N-tap filter separately to each said sub-image and obtaining therefrom at least one scaled image pixel for each said sub-image, storing said at least one scaled image pixel for each said sub-image in a scaled image array.

2. A method according to claim 1 wherein N has a value of 5 for a scaling factor of four to one.

3. A method according to claim 1 wherein applying said N-tap filter variously to said image region includes:
   applying said N-tap filter in a vertical manner to said image region to obtain a first array of products; and
   applying said N-tap filter in a horizontal manner to said first array of products to obtain therefrom a mask of products.

4. A method according to claim 3 further comprising:
   summing together said mask products to obtain a mask result; and
   normalizing said mask result by the total weighting of the mask, said total weighting the sum of the coefficients of the mask, said normalized result yielding the scaled image pixel.

5. A method according to claim 1 wherein said applying the N-tap filter is repeated for a plurality of image regions in addition to said image region, said repeated application yielding a plurality of scaled image pixels.

6. A method according to claim 5 wherein said plurality of scaled image pixels are stored into an array.

7. A method according to claim 5 wherein said plurality of scaled image pixels are sufficient to constitute the entire scaled image.

8. A method according to claim 1 wherein said color planes consist of a red color plane, a first green color plane, a second green color plane and a blue color plane.

9. A method according to claim 1 wherein the scaled image pixel is with the same color plane as the pixels of said sub-image region.

10. A method according to claim 2 wherein said taps of said filter are 1, 2, 2, 2 and 1.

11. A method according to claim 1 wherein N has a value of 3 for a scaling factor of two to one.

12. A method according to claim 11 wherein said taps of said filter are 1, 2 and 1.

13. A method according to claim 1 wherein said taps are selected to favor a central portion of said image region while maintaining the ability to represent edge features occurring elsewhere than said central portion.

14. An apparatus for image processing comprising:
    a dual-mode scaling unit, configured to provide a quarter scaled image in a first mode and a half scaled image in a second mode, said scaling unit including a five-tap filter, wherein said five-tap filter operates as a three-tap filter in said second mode.

15. An apparatus according to claim 14 wherein said five-tap filter operates in said first mode to provide taps of 1, 2, 2, 2, and 1.

16. An apparatus according to claim 14 wherein said five-tap filter operates in said second mode to provide taps of 0, 1, 2, 1, and 0.

17. An apparatus according to claim 14 wherein said scaling unit is composed of shift registers and buffers to provide said filter taps.

18. A system comprising:
    an image capture device, said image capture device configured to capture an original image of a scene, said image capture device further configured to provide quarter or half scaled image data from said original image, wherein said system is operable to scale an image by operating upon a sub-image region having pixels associated with a particular color plane of a color filter array; and
    a computer system coupled to said image capture device, said computer system configured to render said scaled image data.

19. A system according to claim 18 wherein said image capture device is configured to transport said scaled image data over a network.

20. A system according to claim 18 wherein said computer system is configured to perform videoconferencing, said image capture device providing scaled images for said videoconferencing.

21. An apparatus according to claim 15, wherein said apparatus is operable to act upon a sub-image region having pixels associated with a particular color plane of a color filter array.

22. An apparatus comprising:
    an image having regions;
    an N-tap filter for scaling said image according to a first scaling factor, wherein:
    said N-tap filter is operable to act as a filter with fewer than N taps for scaling said image according to a second scaling factor, and
    said N-tap filter is operable to be applied to an image region and to obtain therefrom at least one scaled image pixel according to one of either said first or said second scaling factor; and
    a buffer operable to store said scale pixels.

23. An apparatus according to claim 22, wherein said N-tap filter is a five-tap filter and wherein said five-tap filter is operable to act as a three-tap filter.

24. An apparatus according to claim 22, wherein said N-tap filter is converted to operation as a filter with fewer than N taps by forcing one or more of the filter tap coefficients to zero.

25. An apparatus according to claim 24, wherein said one or more filter tap coefficients are forced to zero by suppressing the output of said buffer.

26. An apparatus according to claim 22, wherein said image region is a sub-image region having pixels associated with a particular color plane of a color filter array.

27. A method according to claim 1 wherein a first of said sub-images has pixels associated with a first color plane and a second of said with a first color plane and a second of said sub-image has pixels also associated with said first color plane.

* * * * *

UNITED STATES PATENT AND TRADEMARK OFFICE
CERTIFICATE OF CORRECTION

PATENT NO. : 6,348,929 B1 Page 1 of 1
DATED : February 19, 2002
INVENTOR(S) : Acharya et al.

It is certified that error appears in the above-identified patent and that said Letters Patent is hereby corrected as shown below:

Column 5,
Line 13, delete "CFPA", insert -- CFA --.

Column 14,
Line 8, delete "ay", insert -- may --.
Line 12, delete "o/from", insert -- to/from --.
Line 38, delete "110", insert -- I/O --.

Signed and Sealed this

Sixth Day of August, 2002

Attest:

Attesting Officer

JAMES E. ROGAN
Director of the United States Patent and Trademark Office